(12) United States Patent
Hong et al.

(10) Patent No.: US 12,189,603 B2
(45) Date of Patent: Jan. 7, 2025

(54) FLEXIBLE ROUTING OF DATABASE OPERATIONS ACCESSING REMOTE TABLES

(71) Applicant: SAP SE, Walldorf (DE)

(72) Inventors: Won Wook Hong, Suwon (KR); Joo Yeon Lee, Seoul (KR); Hyeong Seog Kim, Seoul (KR); Jane Jung Lee, Ansan (KR); Younkyoung Lee, Bucheon (KR)

(73) Assignee: SAP SE, Walldorf (DE)

( * ) Notice: Subject to any disclaimer, the term of this patent is extended or adjusted under 35 U.S.C. 154(b) by 69 days.

(21) Appl. No.: 17/971,506

(22) Filed: Oct. 21, 2022

(65) Prior Publication Data

US 2024/0134838 A1 Apr. 25, 2024
US 2024/0232159 A9 Jul. 11, 2024

(51) Int. Cl.
*G06F 16/23* (2019.01)

(52) U.S. Cl.
CPC .................................. *G06F 16/23* (2019.01)

(58) Field of Classification Search
CPC ........................................................ G06F 16/23
See application file for complete search history.

(56) References Cited

U.S. PATENT DOCUMENTS

| | | | | |
|---|---|---|---|---|
| 5,909,540 A * | 6/1999 | Carter | ..................... | H04L 69/40 |
| | | | | 711/E12.066 |
| 2020/0204345 A1* | 6/2020 | Chee | ..................... | H04L 9/0643 |
| 2021/0328770 A1* | 10/2021 | Gaur | ..................... | H04L 9/0637 |
| 2022/0201056 A1* | 6/2022 | Zajac | ..................... | H04L 67/52 |

* cited by examiner

*Primary Examiner* — Grace Park
(74) *Attorney, Agent, or Firm* — Klarquist Sparkman, LLP

(57) ABSTRACT

The present disclosure provides techniques and solutions for executing requests for database operations involving a remote data source in a system that includes an anchor node and one or more non-anchor nodes. A first request for one or more database operations is received, where at least a first database operation includes a data request for a remote data object. It is determined that the first database operation is not an insert, delete, or update operation, and therefore is assignable to the anchor node or one of the non-anchor nodes. The first database operation is assigned to a non-anchor node for execution. In a particular implementation, for a particular set of requests for a database operation, once an insert, delete, or update operation is received for the remote data object, subsequent operations for the remote data object in the set of requests are assigned to the anchor node for execution.

20 Claims, 10 Drawing Sheets

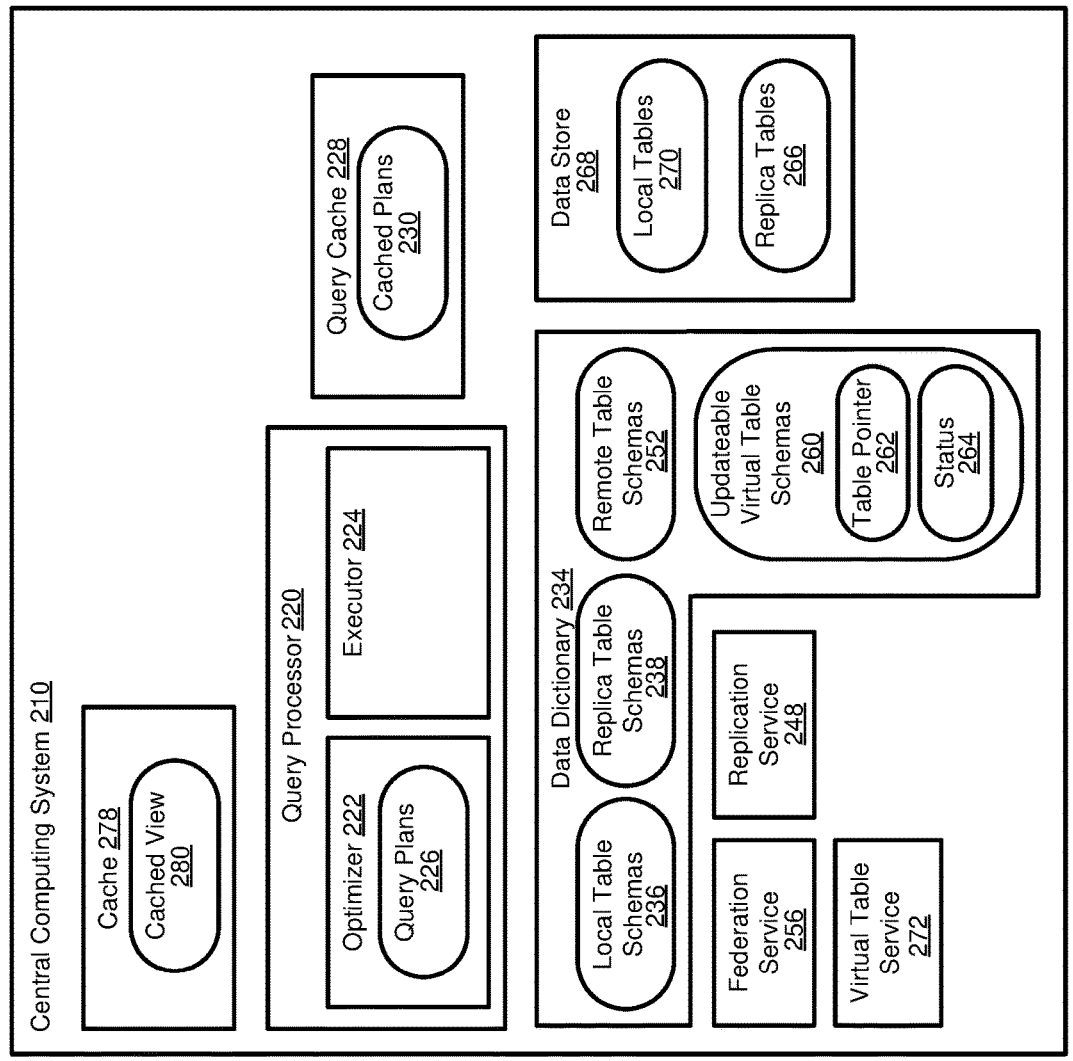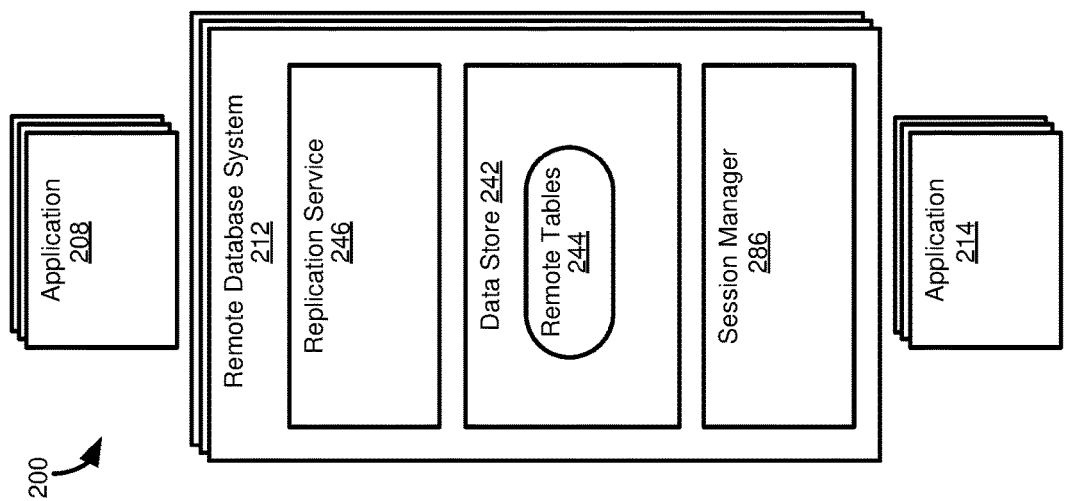
FIG. 2

FLEXIBLE ROUTING OF DATABASE OPERATIONS ACCESSING REMOTE TABLES

FIELD

The present disclosure generally relates to federated database systems. Particular implementations relate to routing of requests for database operations involving operations at a remote data source between anchor nodes and non-anchor nodes in a local computing system.

BACKGROUND

While database technologies have been around for decades, even in mature form, their sophistication and importance continue to increase. Databases are required to handle ever-increasing workloads and volumes of data. Thus, despite their maturity, there continues to be a tension between improving database performance, in terms of query execution speed, for example, and performance quality.

Distributed database systems of various types have been introduced to improve data availability (scale up) as well as raw data volumes that can be handled (scale out). Scale up solutions, such as the addition of worker nodes, which may hold replicas of various database data, can be limited by the nature of the operations to be performed on the database and systems for maintaining data integrity.

For example, the well-known ACID principles of database design include ensuring transaction atomicity, consistency, isolation, and durability. With read operations, ACID properties can be easier to satisfy, as the operations do not modify any data. However, complying with ACID principles can be more difficult once data is changed—whether being inserted, updated, or deleted. As an example, for read operations, if multiple instances of a data source are available, then it may not "matter" where a read option is performed, which gives a database system more flexibility in workload management. Offloading operations that insert, delete, or modify data can be more complex, as ACID principles indicate that a database operation should be able to read the results of its own write operations, even if the results of such write operations are not yet "committed," and thus may not be available to other readers/processes in the database system. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for executing requests for database operations involving a remote data source in a system that includes an anchor node and one or more non-anchor nodes. A first request for one or more database operations is received, where at least a first database operation includes a data request for a remote data object. It is determined that the first database operation is not an insert, delete, or update operation, and therefore is assignable to the anchor node or one of the non-anchor nodes. The first database operation is assigned to a non-anchor node for execution. In a particular implementation, for a particular set of requests for a database operation, once an insert, delete, or update operation is received for the remote data object, subsequent operations for the remote data object in the set of requests are assigned to the anchor node for execution.

In one aspect, the present disclosure provides a process of executing a request for a database operation that includes a data request for a remote data object at a system that includes an anchor node and one or more non-anchor nodes. At a database system, a first request for one or more database operations is received. It is determined that a first database operation of the one or more database operations of the first request includes a data request for a first remote data object, the first remote data object located on a first remote computing system accessed by the first database system using data federation. It is determined whether the first database operation includes an insert, delete, or update operation for the first remote data object.

In response to determining that the first database operation does not include an insert, delete, or update operation for the first remote data object, the first database operation is assigned to a first non-anchor node of the database system, where data operations for remote data sources that do not include an insert, delete, or update operation for a remote data object are assignable for execution by a non-anchor node of the database system or by an anchor node of the database system. The first database operation is caused to be executed by the first non-anchor node.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 is a diagram depicting a computing environment in which a database system can access data in a remote computing system using data federation, including through virtual tables.

DETAILED DESCRIPTION

Example 1—Overview

Figure 1:
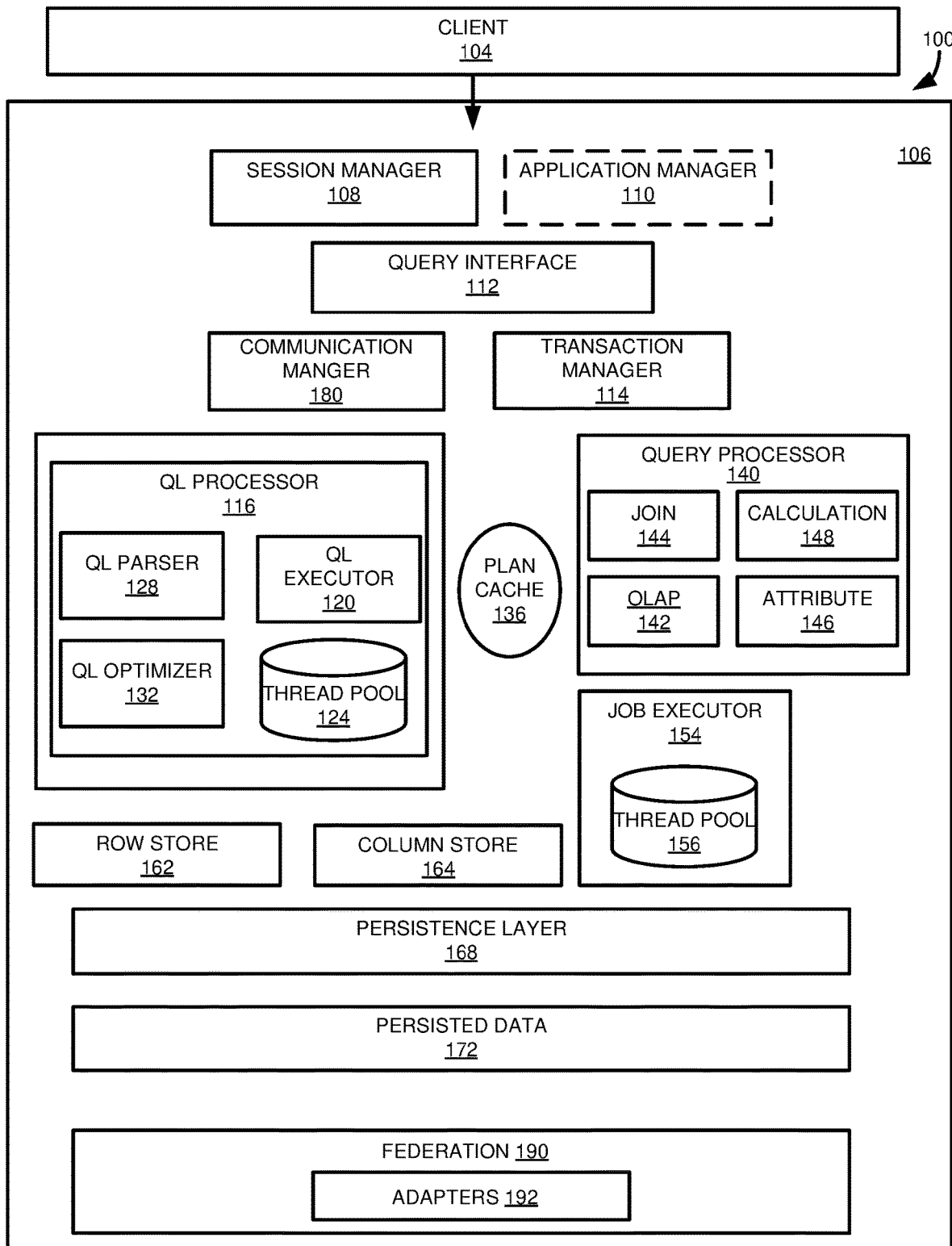
FIG. 1 is a diagram depicting an example database system which can be used in implementing aspects of disclosed technologies.

While database technologies have been around for decades, even in mature form, their sophistication and importance continue to increase. Databases are required to handle ever-increasing workloads and volumes of data. Thus, despite their maturity, there continues to be a tension between improving database performance, in terms of query execution speed, for example, and performance quality.

Distributed database systems of various types have been introduced to improve data availability (scale up) as well as raw data volumes that can be handled (scale out). Scale up solutions, such the addition of worker nodes, which may hold replicas of various database data, can be limited by the nature of the operations to be performed on the database and systems for maintaining data integrity.

For example, the well-known ACID principles of database design include ensuring transaction atomicity, consistency, isolation, and durability. With read operations, ACID properties can be easier to satisfy, as the operations do not modify any data. However, complying with ACID principles can be more difficult once data is changed—whether being inserted, updated, or deleted. As an example, for read operations, if multiple instances of a data source are available, then it may not "matter" where a read option is performed, which gives a database system more flexibility in workload management. Offloading operations that insert, delete, or modify data can be more complex, as ACID principles indicate that a database operation should be able to read the results of its own write operations, even if the results of such write operations are not yet "committed," and thus not yet available to other readers/processes in the database system. Accordingly, room for improvement exists.

A particular problem that can arise is that while requests for database operations that are strictly "read" operations may be off loadable to "worker" computing systems (or "nodes"), operations that include a write operation, or even those that may include a write operation, must be performed by a "coordinator" computing system (or node). Coordinator and worker systems can also be referred to as "master" and "slaves," respectively. The present disclosure also refers to a master node as an "anchor" node, where a node that is not an anchor can simply be referred to as a "node" (which the omission of "anchor" indicates that the node is not an anchor node), or a node that is not an anchor node can be specifically referred to as a "non-anchor node."

As will be described in more detail, the present disclosure provides techniques that expand the types of operations that can be offloaded to non-anchor nodes. The present disclosure provides the specific example of offloading operations that relate to federated data requests—either reading data or writing data (where, unless indicated otherwise, a "write" operation is any operation that modifies database data, such as inserting, deleting, or modifying data).

"Write" operations can also be referred to in the present disclosure as "DML" (data manipulation language) statements. There are art-recognized uses of "DML" that differ in whether a "SELECT" statement is a DML statement, since a "SELECT," at least in its more basic forms, only retrieves data, and does not "manipulate" it. However, even "basic" SELECT statements can modify data (such as aggregation or grouping of data), even if the modifications are only reflected in the data that is returned in a response to a request for a database operation, rather than "changing" the data that is actually stored (or "persisted"). Further, some query languages allow for certain types of "SELECT" operations to modify stored data, and so whether a "SELECT" statement is a DML statement or not, such as being a "data query language" (DQL) statement, can depend on specific usage of "SELECT." A "SELECT" operation is considered a DML statement in the present disclosure so long as it changes data stored in a data source, such as when the operation is committed, but not when it simply retrieves data or retrieves data and modifies it only to the extent results are provided in response to a specific request for a database operation, without changing the stored data (in other words, a subsequent query would "see" the same data as the prior query).

Data federation refers to a technique of "mapping" "virtual" data sources in one database system to "actual" data sources in another, autonomous, database system, where the database systems can be of the same or different types. Typically, a user or a computing process (such as a software application) can retrieve data from "virtual" data sources or from sources that are "local" to a queried database system in the same manner, without needing to know that the data is not all maintained in the same location/database system, and without needing to understand how to access data in the different database systems.

The present disclosure also proceeds with the specific example of "elastic" worker nodes. An "elastic" worker node is a node that can be instantiated and de-instantiated on demand, such as in a database system that is implemented in a cloud (or hyperscalar) environment. Elastic systems are thus more flexible than prior types of distributed database systems, where worker nodes are typically configured in a "fixed" manner.

Generally, the disclosed techniques provides that any request (such as a read or write request), or series of requests for a database operation (such as a "transaction," as that term is typically used in the database arts), is treated independently in terms of being analyzed for execution on an anchor node or a non-anchor node, and also independently in terms of what data source is being accessed by the operation. In the example of federated data sources, a data source is referred to as a "virtual table," although the data source can, at least in some cases, be another type of data object, such as a database "view."

Specifically, a local system includes virtual objects that are mapped to the "actual" data source in the "remote," federated database system. The mapping is referred to as a "virtual table," although, as indicated, other types of "virtual" artifacts or objects may be handled in an analogous manner By default, it is assumed that requests for database operations for a given virtual table can be handled, mediated, or otherwise executed by any node, whether an anchor node or a non-anchor node.

When a first write operation/DML statement is received for a given virtual table, that operation, and any subsequent operations in a series of operations/a transaction that is being handled in an atomic way, are routed to the anchor node, and not to non-anchor nodes. However, operations for other virtual tables are handled independently. So, operations for a first virtual table can be performed on any node until a first write operation is received, but operations for a second virtual table can continue to be performed using any node unless/until a write operation for the second virtual table is received. The operations and artifacts that can be processed using disclosed techniques include those involving table relocation for remote joins and for stored procedures, as will be further described.

Disclosed techniques can provide a number of advantages. One advantage is that a database operation or series of database operations can be executed, at least under certain conditions, by non-anchor nodes, which helps improve the usage of worker nodes/reduces the workload performed by the anchor node. This benefit is further improved by another advantage of disclosed techniques, which is that routing can be handled on a more granular basis than entire operations/statements. That is, even if a first operation in a statement is restricted to being performed at an anchor node because of a previous write with respective to a first virtual table, other operations, whether a same operation or a subsequent operation, with respect to a second virtual table remain performable at non-anchor nodes, so long as no write operation has been yet received that targets the second virtual table.

Example 2 describes an example database system that can be used in implementing disclosed technologies, where the database system can represent an anchor node, or where at least some of the functionality of the database system can be included in a non-anchor node. Similarly, the database system can be an example of either a local database system or a federated database system that is accessed by the local system. Example 3 provides an example of a virtual table, where the virtual table includes a logical pointer that can be updated to point to different locations, including a location in a federated data source or in a local data source (including a local table, or a table maintained in a cache). Although, it should be appreciated that a virtual table can be implemented in a different manner, including in a way that is "statically" mapped to a particular federated data source. Examples 4-9 more specifically describe disclosed techniques for flexible execution of requests for database operations.

Example 2—Example Database Architecture

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers.

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

For the purposes of the present disclosure, one task that can be performed by the query language optimizer 132 is determining a location where a request for a database operation, or a portion thereof, should be performed. For instance, a complex query may be submitted that reads data from multiple data sources. At least one of the data sources may be a virtual table, and the request can be performed on an anchor node, such as a node represented by a computing system implementing the database environment 100, or another node, including a node that was dynamically created in response to a request for a database operation, another request for a database operation, or based on overall workload/performance of a database system that include one or more nodes (that is, if a workload exceeds a threshold, a non-anchor node can be instantiated).

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at remote systems. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Example 3—Example Virtual Tables, Including with Updatable Logical Pointers

FIG. 2 illustrates a computing environment 200 in which disclosed embodiments can be implemented. The basic computing environment 200 of FIG. 2 includes a number of features that can be common to different embodiments of the disclosed technologies, including one or more applications 208 that can access a central computing system 210, which can be a cloud computing system. The central computing system 210 is shown as a monolithic/unitary system, but it should be appreciated that, particularly in a cloud environment, the central computing system can include a number of computing systems that function together as a single system. For example, the central computing system 210 can be implemented as a plurality of "nodes," including an anchor node and zero or more non-anchor nodes. A central computing system 210 can also be a more typical "distributed" database system, which includes a master node and one or more worker nodes.

The central computing system 210 can act as such by providing access to data stored in one or more remote database systems 212. In turn, the remote database systems 212 can be accessed by one or more applications 214. In some cases, an application 214 can also be an application 208. That is, some applications may only (directly) access data in the central computing system 210, some applications may only access data in a remote database system 212, and other applications may access data in both the central computing system and in a remote database system.

The central computing system 210 can include a query processor 220. The query processor 220 can include multiple components, including a query optimizer 222 and a query executor 224. The query optimizer 222 can be responsible for determining a query execution plan 226 for a query to be executed using the central computing system 210. The query plan 226 generated by the query optimizer 222 can include both a logical plan indicating, for example, an order of operations to be executed in the query (e.g., joins, projections) and a physical plan for implementing such operations. Once developed by the query optimizer 222, a query plan 226 can be executed by the query executor 224. Query plans 226 can be stored in a query plan cache 228 as cached query plans 230. When a query is resubmitted for execution, the query processor 220 can determine whether a cached query plan 230 exists for the query. If so, the cached query plan 230 can be executed by the query executor 224. If not, a query plan 226 is generated by the query optimizer 222. In some cases, cached query plans 230 can be invalidated, such as if changes are made to a database schema, or at least components of a database schema (e.g., tables or views) that are used by the query.

A data dictionary 234 can maintain one or more database schemas for the central computing system 210. In some cases, the central computing system 210 can implement a multitenant environment, and different tenants may have different database schemas. In at least some cases, at least some database schema elements can be shared by multiple database schemas.

The data dictionary 234 can include definitions (or schemas) for different types of database objects, such as schemas for tables or views. Although the following discussion references tables for ease of explanation, it should be appreciated that the discussion can apply to other types of database objects, particularly database objects that are associated with retrievable data, such as materialized views. A table schema can include information such as the name of the table, the number of attributes (or columns or fields) in the table, the names of the attributes, the data types of the attributes, an order in which the attributes should be displayed, primary key values, foreign keys, associations to other database objects, partition information, or replication information.

Table schemas maintained by the data dictionary 234 can include local table schemas 236, which can represent tables that are primarily maintained on the central computing system 210. The data dictionary 234 can include replica table schemas 238, which can represent tables where at least a portion of the table data is stored in the central computing system 210 (or which is primarily managed by a database management system of the central computing system, even if stored other than on the central computing system, such as being stored in a data lake or in another cloud service). Tables having data associated with replica tables schemas 238 typically will periodically have their data updated from a source table, such as a remote table 244 of a data store 242 of a remote database system 212.

Replication can be accomplished using one or both of a replication service 246 of the remote database system 212 or a replication service 248 of the central computing system 210. In particular examples, the replication service can be the Smart Data Integration (SDI) service, SAP Landscape Transformation Replication Server, SAP Data Services, SAP Replication Server, SAP Event Stream Processor, or an SAP HANA Direct Extractor Connection, all of SAP SE, of Walldorf, Germany.

In some cases, data in a remote database system 212 can be accessed by the central computing system 210 without replicating data from the remote database system, such as using federation techniques. The data dictionary 234 can store virtual table schemas 252 for virtual tables that are mapped to remote tables, such as a remote table 244 of a remote database system 212. Data in the remote table 244 can be accessed using a federation service 256, such as using the Smart Data Access protocol of SAP SE, of Walldorf, Germany. The federation service 256 can be responsible for converting query operations into a format that can be processed by the appropriate remote database system 212, sending the query operations to the remote database system, receiving query results, and providing the query results to the query executor 224.

The data dictionary 234 can include updatable virtual table schemas 260 that have updatable logical pointers 262. The updated virtual table schemas 260 can optionally be associated with status information 264. The table pointer 262 can be a logical pointer used to identify what table should be accessed for data of the corresponding virtual table schema 260. For example, depending on the state of the table pointer 262, the table pointer can point to the remote table 244 of a remote database system 212 or a replica table 266 (which can be generated from the remote table 244) located in a data store 268 of the central computing system 210. The data store 268 can also store data for local tables 270, which can be defined by the local table schemas 236.

The table pointer 262 can be changed between the remote table 244 and the replica table 266. In some cases, a user can manually change the table pointed to by the table pointer 262. In other cases, the table pointer 262 can be automatically changed, such as in response to the detection of defined conditions.

The status information 264 can include an indicator identifying a virtual table schema 260 as being associated with a remote table 244 or a replica table 266. The status information 264 can also include information about the replication status of a replica table 266. For example, once a request is made to change the table pointer 262 to point to a replica table 266, it may take time before the replica table is ready for use. The status information 264 can include whether a replication process has been started, has been completed, or a progress status of generating the replica table 266.

Changes to updateable virtual table schemas 260 and managing replica tables 266 associated with virtual table schemas can be managed by a virtual table service 272. Although shown as a separate component of the central computing system 210, the virtual table service 272 can be incorporated into other components of the central computing system 210, such as the query processor 220 or the data dictionary 234.

When a query is executed, the query is processed by the query processor 220, including executing the query using the query executor 224 to obtain data from one or both of the data store 242 of the remote database system 212 or the data store 268 of the central computing system 210. Query results can be returned to the application 208. Query results can also be cached, such as in a cache 278 of the central computing system 210. The cached results can be represented as cached views 280 (e.g., materialized query results).

The applications 214 can access data in the remote database system 212, such as through a session manager 286. The applications 214 can modify the remote tables 244. When a table pointer 262 of an updateable virtual table schema 260 references a remote table 244, changes made by the applications 214 are reflected in the remote table. When a table pointer 262 references a replica table 266, changes made by the applications 214 can be reflected in the replica table using the replication service 246 or the replication service 248.

Figure 3:
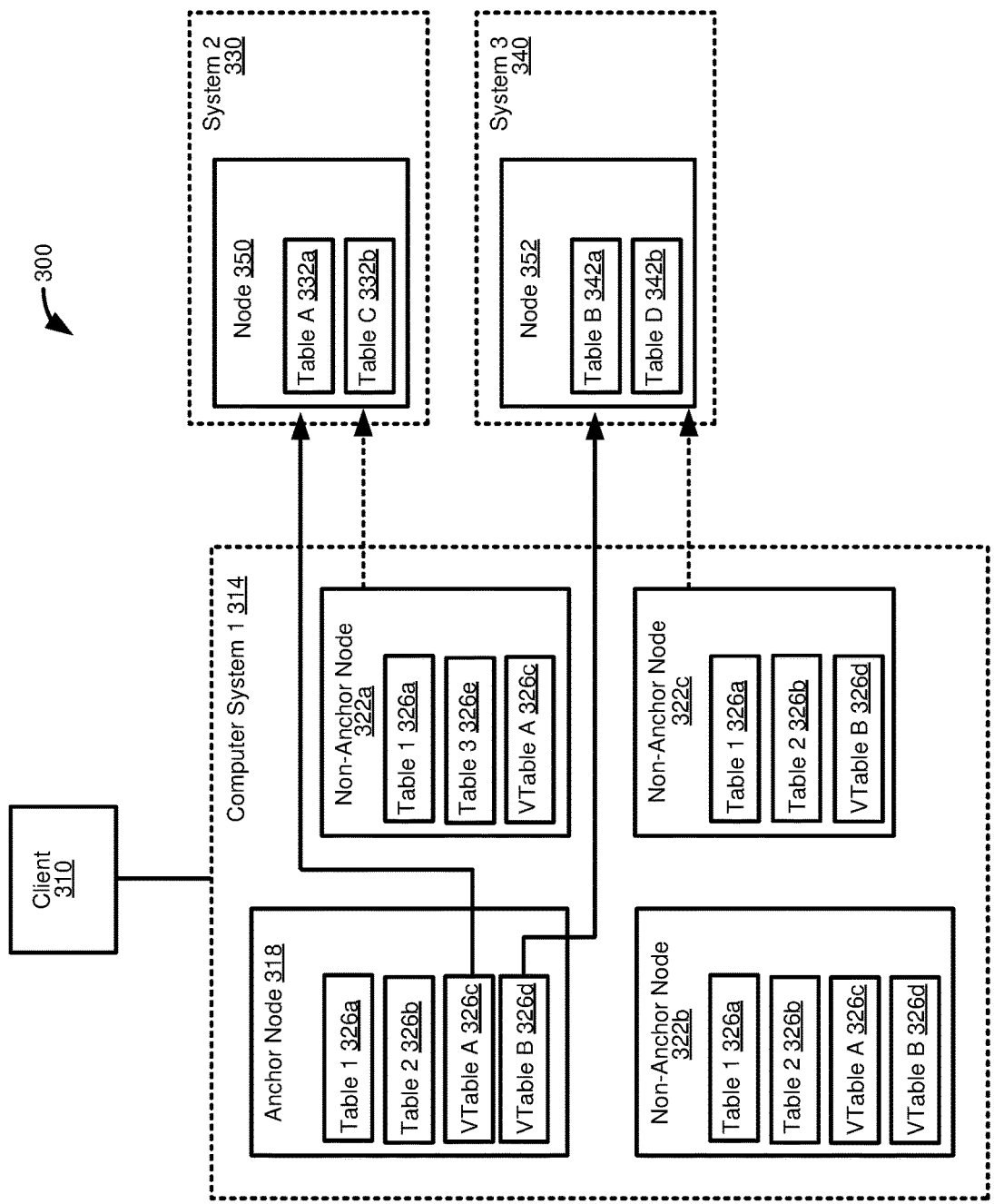
FIG. 3 is a diagram illustrating an example computing environment where a computing system that includes an anchor node and one or more non-anchor nodes can execute data operations for data in one or more remote computing systems using the anchor node or a non-anchor node.

Example 4—Example Database Environment with Local System Having Anchor and Non-Anchor Nodes, and Virtual Tables Mapped to Remote Computing System FIG. 3 illustrates a computing environment 300 where a client 310 submits requests for database operations to a computing system 314. The computing system 314 includes a plurality of nodes, including an anchor, or coordinator node, 318 and a plurality of worker, or non-anchor nodes, 322 (shown as non-anchor nodes 322a-322c). As explained in Example 1, in some implementations, the worker nodes 322 can be dynamically instantiated and removed as needed/on demand.

In particular implementations, the worker nodes 322 are configured to perform read operations, but are not configured to perform write operations. In this case, the write operations are performed at the anchor node 318. Performing write operations at the anchor node 318 can be beneficial, as it can facilitate maintaining ACID properties, such as consistency, during a series of database operations that include a write operation, as otherwise the results of a write operation may not be visible at other nodes involved in executing a particular request for database operations, or a series of requests for database operations.

It can be seen that the anchor node 318 includes a plurality of tables 326a-326d. Tables 326a, 326b are local tables, where the data for the tables is directly available in the computing system 314. In some cases, the computing system 314 can be the "primary" source of the data in the tables 326a, 326b, while in other cases it is not the primary source, such as when the tables maintain data replicated from another computing system.

Tables 326c, 326d are virtual tables. The data for the tables 326c, 326d is maintained in another, remote, computing system that is autonomous, such as the remote computing system 330 or the remote computing system 340. In particular, virtual table 326c is "mapped" to table 332a of remote computing system 330, and virtual table 326d is mapped to table 342a of remote computing system 340. The tables 332a, 342a are "local" to their respective computing systems 330, 340, which contain additional local tables 332b, 342b. Although not shown in FIG. 3, it should be appreciated that remote computing systems 330, 340 can also have virtual tables, including virtual tables that are mapped to local tables of the computing system 314, whether of the anchor node 318 or one of the non-anchor nodes 322. Further, the remote computing systems 330, 340 may have one or more nodes, 350, 352, respectively, where a node can be an anchor node or a non-anchor node.

If the client 310 sends a request to the computing system 314 that includes data maintained in the tables 326c or 326d, the computing system 314 sends a request to read or write data to the appropriate remote computing system 330, 340. While this data may be temporarily stored, or cached, in the computing system 314, typically the amount of data is limited to that retrieved or generated in response to a particular request for database operations, and is typically not maintained in a permanent way, as might be done for a replicated data. That is, cached data may be deleted after a particular amount of time has passed or according to a cache management policy (such as "most frequently used," "least recently used," etc.).

The non-anchor nodes 322 can include tables that are the same as, or different than, the tables that are local to the anchor node 318 or which are local to the computing system 314, but are not maintained on the anchor node. Similarly, the non-anchor nodes 322 can have definitions of virtual tables that are mapped to a table on a remote system 330, 340, where the virtual table definitions in a non-anchor node can be the same as in the anchor node 318, or which are defined only in a non-anchor node and not in the anchor node (such as table 326e of non-anchor node 322a).

When an anchor node 318 and a non-anchor node 322 have a copy of the same local table, at least read operations can be performed at either node. So, as shown both anchor node 318 and non-anchor node 322a have a copy of table 1 (326a), and a request from the client 310 to read data on table 1 could be performed at either of the nodes 318, 322a. Similarly, both anchor node 318 and a non-anchor node 322a can be used to read data from a remote system 330, 340 using data federation. Again, both anchor node 318 and non-anchor node 322a include a definition of a virtual table 326c, and so either node 318, 322 can be used to communicate with the remote system 330 to read data from the source table 332a in the remote system.

In some cases, multiple non-anchor nodes 322 include the same local table or virtual table as the anchor node 318, such as in FIG. 3 where the non-anchor node 322a and the non-anchor node 322b each include the virtual table 326c. As described in Example 1, disclosed techniques provide that read requests for a virtual table can be performed by a non-anchor node 322 or by the anchor node 318, and where operations, including read operations, are performed at the anchor node, for that particular virtual table, after a first write operation is received for the virtual table.

The decision of where a particular read operation should be performed can be carried out by a component of the computing system 314, such as using a query optimizer of the anchor node 318. After a write operation is received for a virtual table, any query plans that access that virtual table through a non-anchor node 322 can be invalidated, and a query plan recompiled with the constraint that the virtual table with the write operation is accessed using the anchor node 318.

Figure 4:
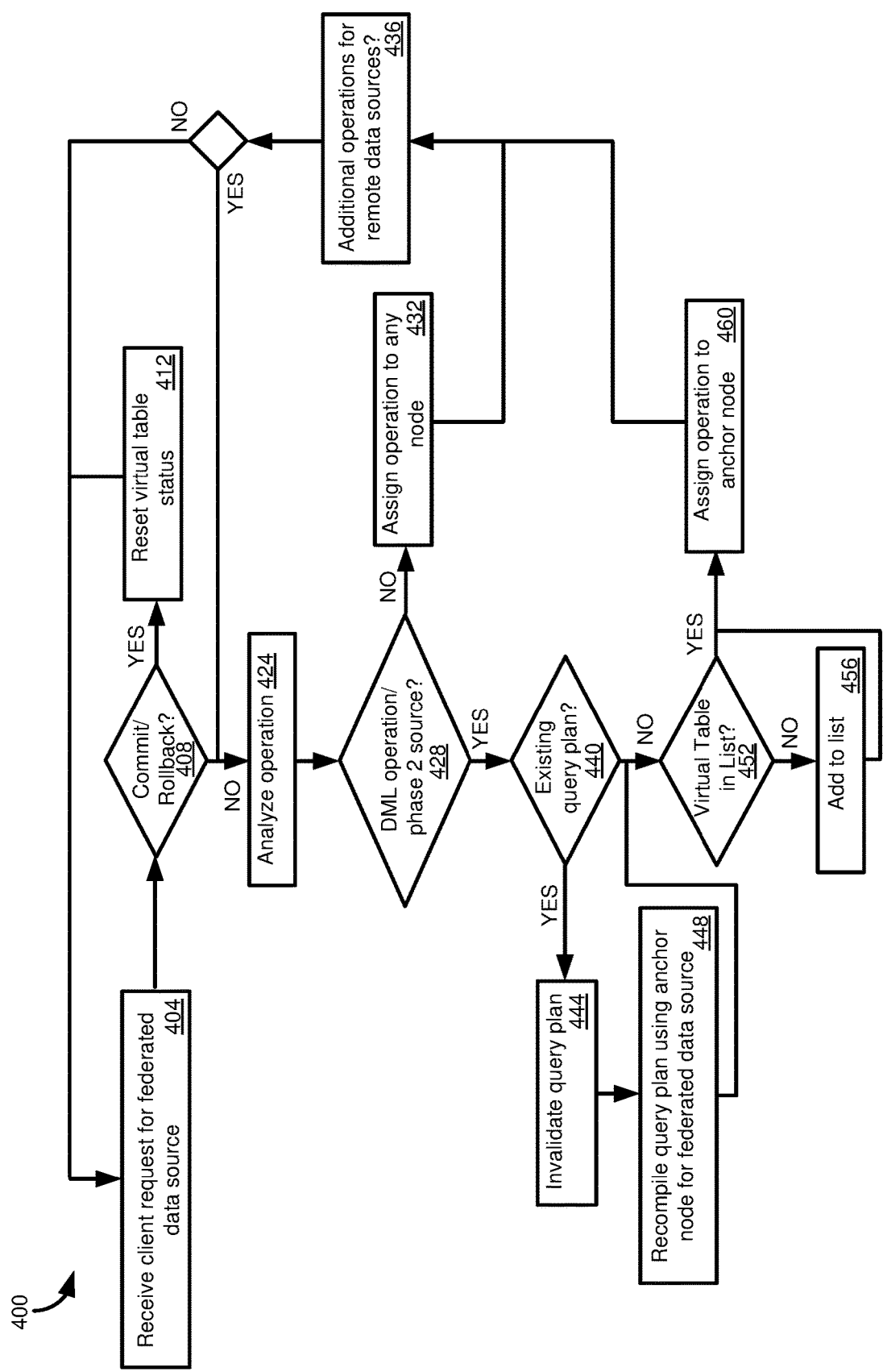
FIG. 4 is a flowchart of a process for determining whether a data operation for a remote data object can be executed by a non-anchor node, or whether the data operation must be executed by the anchor node.

Example 5—Example Updatable Routing of Database Operations Involving Virtual Tables FIG. 4 is a flowchart of a method 400 that illustrates how virtual tables can be selectively accessed using non-anchor nodes until a write operation is received. A client request for database operations that specifies a federated data source, such as specifying a virtual table that is mapped to a table of the federated data source, is received at 404.

It is determined at 408 if a commit/rollback statement has been received, assuming there is an open database transaction (as that term is used in the art, generally referring to a series of requests for database operations that are handled together as a unit, such as being collectively committed or rolled back, according to the "atomicity" property of ACID principles). In at least some cases, when a commit/rollback statement is received, the status of a virtual table is reset to the first phase at 412, at least if the commit/rollback statement is for a transaction that specified a write operation for the virtual table. That is, once a discrete request for database operations or series of requests for database operations that are to be treated as an atomic unit and involve a write operation for a virtual table are completed, the status of the virtual table is reset to a status where read operations can be performed at the anchor node or on a non-anchor node. After 412, the method 400 can end, or can return to 404 once a new request for database operations has been received. If no commit or rollback statement was found at 408, the method 400 can proceed to 424.

An operation of the request for database operations is analyzed at 424. It is determined at 428 whether the request for database operations specifies a write operation for the virtual table, or whether a write request has already been received. In some cases, a virtual table is referred to as being in a first phase if a write request has not been received, and transitioning to what is referred to as a second phase once a write request is received for the virtual table. Thus, operations at 428 can include determining whether the virtual table is in the first phase or the second phase. In a particular implementation, determining whether a write operation has been received for the virtual table, or determining if the virtual table is in the second phase, can be determined by checking a lock table to see if a lock, such as a lock for a write operation, has been received for the virtual table. If it is determined at 428 that the virtual table is in the first phase, but that a write request was received, the virtual table can be transitioned to the second phase.

If it is determined at 428 that the virtual table in the request for database operations is not in the second phase, and the operations do not include a write request for the virtual table, the operation is assigned at 432 to any node, an anchor node, or a non-anchor node, for execution. That is, once a write request is received for a virtual table, further operations for the virtual table, whether read operations or write operations, are assigned to the anchor node, while prior to a write request being received, when the virtual table is in the first phase, the operation (a read only operation) can be assigned to the anchor node or to a non-anchor node.

For example, in one implementation, the query optimizer can use criteria such as other operations in a particular request for database operations, or elements thereof, to determine whether a read request should be executed at the anchor node or at a non-anchor node. Or, performance considerations, such as a load on the anchor node or the non-anchor nodes, or communication delays if a non-anchor node is used, can be considered when determining whether a read operation should be performed at the anchor node or at a non-anchor node. After assigning the operation to an anchor node or a non-anchor node at 432, the method 400 can proceed to 436 where it is determined if the request for database operations includes an additional operation on a virtual table. If so, the method 400 returns to 424. Otherwise, the method returns to 404.

It should also be noted that additional actions can be taken after determining that no additional remote data sources are included in a request for database operations. For example, additional query optimization for the request for database operations can be performed, including for portions of the request for database operations that do not involve virtual tables, or which manipulate data from a request for database operations on a virtual table, such as joining data retrieved from the virtual table with data from another table, which can be a local table or a virtual table.

If it is determined at 428 that the request for database operations includes a write request for the virtual table, or that the virtual table is in a second phase, it is determined at 440 whether the virtual table is included in any existing query plans having operations for the virtual table performed at a non-anchor node. If so, the existing query plans are invalidated at 444 and then recompiled at 448 setting operations for the virtual table to be performed by the anchor node. After 448, or if it is determined at 440 that the virtual table is not in any query plans having operations for the virtual table being performed at a non-anchor node, the method 400 proceeds to 452, where it is determined if the virtual table is already in a list of virtual tables in the second phase/whose execution should be at the anchor node and not at non-anchor nodes, or is otherwise designated as being in the second phase. If not, the table is added to the list/designated as being in the second phase at 456. After 456, or if it was determined at 452 that the virtual table was already on the list/designated as being in the second phase, the method 400 proceeds to 460, where the operation is assigned for execution at the anchor node. The method 400 then proceeds to 436.

Figure 5:
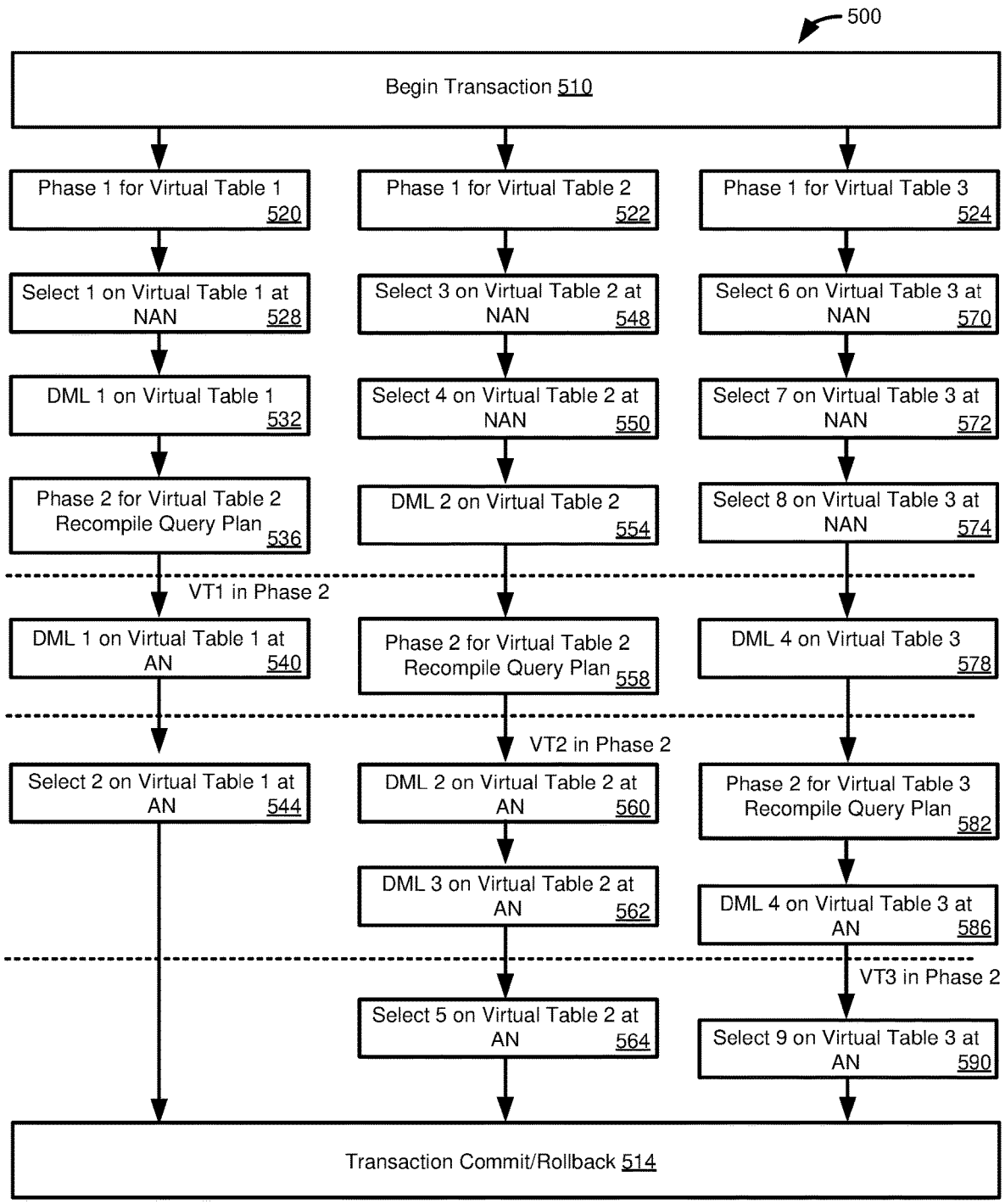
FIG. 5 is a timing diagram illustrating how different remote data sources are treated independently in determining whether a data operation can be performed by a non-anchor node or must be executed by an anchor node.

Example 6—Example Timing Diagram Illustrating Independence of Virtual Tables for Routing Phases FIG. 5 is a diagram illustrating how different virtual tables can be in different states over a series of requests for database operations 500, such as database statements (DQL statements or DML statements) within a database transaction. The database transaction starts at 510 and ends at 514 with a commit or rollback statement.

At the beginning of the transaction, three virtual tables are all in a first phase, as indicated at 520, 522, 524, where read requests for the virtual tables can be performed on either an anchor node or a non-anchor node. Taking first the operations for virtual table 1, a select statement is received. Since the first virtual table is in the first phase, the select statement can be executed (by sending an appropriate request to the federated database system) by the anchor node or by a non-anchor node. In this case, as shown at 528, the select is assigned for execution by a non-anchor node (NAN).

A DML statement (insert, update, delete) operation is received for the first virtual table at 532. Since a write operation causes the first virtual table to transition from a first phase to a second phase at 536, query plans that include the first virtual table are invalidated and recompiled so that operations for the first virtual table are performed by the anchor node. Subsequently, the first DML statement is executed at 540 on the anchor node. A second select statement is received and executed on the anchor node at 544, since the first virtual table is now in the second phase due to the first DML statement.

Turning to the second virtual table, select operations are received at 548, 550. The first and second virtual tables are treated independently with respect to whether database operations must be performed on an anchor node or can also be performed by a non-anchor node. Accordingly, the select operations 548, 550 are executed on non-anchor nodes. Note that the select operations could be performed on the same non-anchor node or on different non-anchor nodes, and the non-anchor nodes used for the select operations 548, 550 can be the same as, or different than, non-anchor nodes used for executing operations for the first virtual table or the third virtual table, such as the non-anchor node used for the select operation at 528.

A DML operation for the second virtual table to is received at 554. The receipt of the DML operation causes the second virtual table to enter the second phase at 558, where operations are executed at the anchor node, as well as invalidation and recompilation of existing query plans that include the second virtual table so that operations, including read operations, are performed at the anchor node. The DML operation is then executed at 560 on the anchor node. An additional DML operation and select operation are subsequently received and executed at 562, 564. Since the operations are received after the second virtual table transitioned to the second phase, they are indicated for execution by the anchor node.

The operations for virtual table 1 and virtual table 2 demonstrate how the virtual tables are independently considered as to when execution is constrained to an anchor node. This independence is beneficial in that it allows greater utilization of non-anchor nodes as compared with an implementation where read operations might be allowed at non-anchor nodes if a write operation has not been received for a virtual table, but where all virtual table operations are constrained to the anchor node once a write operation is received for any virtual table.

The operations for virtual table 3 further illustrate the independence of virtual table operations. Virtual table 3 has select operations 570, 572, 574 that are executed at non-anchor nodes, even though operation 572 was executed at the time the DML statement 532 was received for virtual table 1 and operation 574 was executed after the virtual first table transitioned to the second phase and at the time the DML operation 554 was received for the second virtual table.

As with the first and second virtual tables, once a DML operation 578 is received for the third virtual table, the third virtual table enters the second phase, and query plans are invalidated and recompiled, at 582. The DML operation is executed at 586. A subsequent select statement is executed at 590 using the anchor node, since operations involving the third virtual table are constrained by the anchor node as a result of the DML operation 586.

When the transaction commits or is rolled back at 514, the status of the first, second, and third virtual tables can be reset so that they are again in the first phase for future transactions/requests for database operations, at least to the extent the transaction includes write/DML operations for the virtual tables. This can be analogous to table locks being released when a transaction commits or is rolled back. For virtual tables not accessed by a transaction, or accessed only for read operations, by a transaction, transaction commit or rollback would typically not cause the state of such virtual tables to reset. Rather, the virtual table state would be reset if another transaction was committed or rolled back that included a write operation for that virtual table.

Example 7—Example Routing of Database Operations Involving a Remote Join

Figure 6:
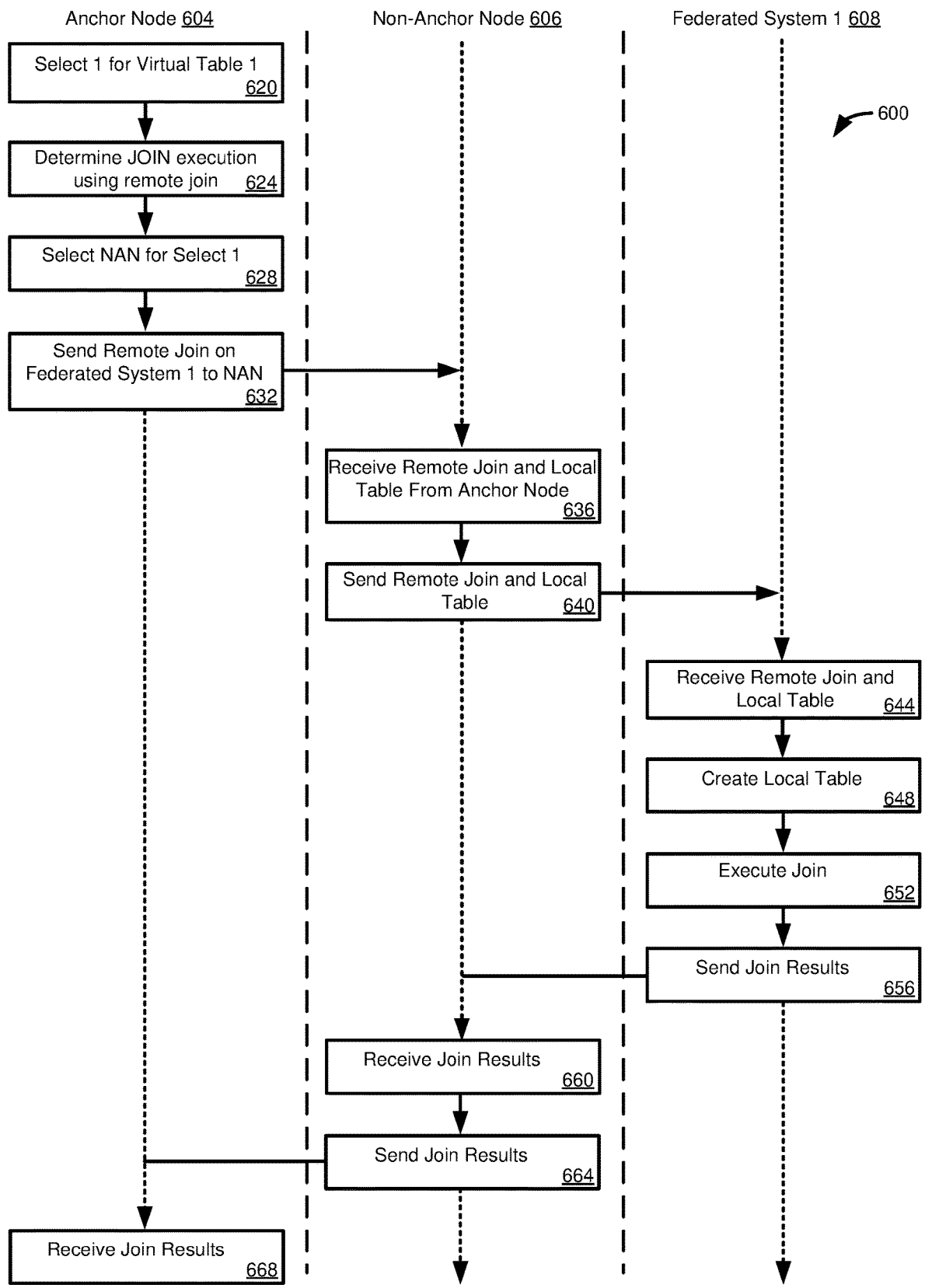
FIG. 6 is a timing diagram illustrating operations in executing data operations at a federated computing system using an anchor node and a node anchor node that involve using data from a local computing system in a remote join performed at the federated computing system.

FIG. 6 is a timing diagram representing actions 600 at an anchor node 604, a non-anchor node 606, and a federated system 608 where a request for database operations involves joining data read from a virtual table with other data, such as data in a local system. That is, a typical function by a query optimizer is determining how to most efficiently execute joins. Joins can be computationally expensive operations, both in terms of processor usage and in terms of memory or persistent storage needed to execute a join. If the data used in the join is not natively maintained in a way that all of the data needed for the join can be accessed from local memory or storage, additional computational resources are required to transfer data from one system to another so that the join can be performed.

Consider a scenario where a local table is to be joined with a remote table. In some cases, relevant information can be located in the remote table, transferred to a computing system that maintains the local table, and then joined with the local table. However, if the amount of data on the remote system is large, it can be quite expensive to send the data from the remote system to the local system. Thus, a query optimizer may decide that the join should be performed by sending a local table to a remote computing system and having the join performed on the remote computing system. This strategy can be particularly useful when the local table is small and performing the join on the remote system can significantly reduce the size of a result set transferred from the remote system to the local system.

Disclosed techniques for having non-anchor nodes execute read operations for federated data sources, such as using virtual tables, can include read operations that involve a JOIN, and more specifically where a read operation to be performed by the non-anchor node includes sending a local table to a remote computing system for a remote join. At 620, a select operation is received at the anchor node 604 that includes an operation for a virtual table. The select operation includes a join between other data, such as local data stored in the anchor node or a non-anchor node 606, and data in the virtual table. It is determined, such as by a query optimizer, at 624, that the select/join operation should be conducted by sending local data, such as a local table, from the system with the anchor and non-anchor nodes 606, 606 to the federated system 608.

Although the join has been determined to be a remote join, it has not yet been determined whether the remote join should be executed by the anchor node 604 or by the non-anchor node 606. As has been described, read operations, generally, can be performed by the anchor node 604 or the non-anchor node 606 provided that the virtual table associated with the read operation has not yet received a write operation/is still in a first phase. The "remote join" can be treated as a particular case/example of this technique. Accordingly, the non-anchor node 606 is selected at 628 to execute the remote join. However, as discussed, alternatively the anchor node 604 could have been selected instead to carry out the remote join.

The remote join operation, and optionally local table data to be used in the remote join, are sent from the anchor node 604 to the non-anchor node 606 at 632, being received by the non-anchor node at 636. The non-anchor node 606 processes the remote join request and sends the remote join and local table data to the federated computing system 608 at 640, which are received by the federated computing system at 644.

The federated system 608 processes the remote join request, including creating a local table at 648 storing the data received at 640 for use in conducting the join. The remote join is executed at 652, joining data from the local table created in response to the remote join request with the data in the federated system 608 mapped to by the virtual table ("natively" local to the federated system 608). Join results are obtained and sent from the federated system 608 to the non-anchor node 606 at 656, where they are received by the non-anchor node at 660.

In some cases, the non-anchor node 606 performs additional operations using the join results received at 660. In other cases, the non-anchor node 606 sends the join results to the anchor node 604 at 664, where they are received by the anchor node at 668.

Although described as being performed by the anchor node 604, in some cases the operations can be performed by a non-anchor node, including the non-anchor node 606, at least until a write operation for a virtual table is encountered. For example, in some cases a client can connect directly to a non-anchor node, and at least initial query analysis and processing can be carried out by the non-anchor node, even if some or all of the operations in the query must be performed by the anchor node.

Example 8—Example Routing Operations Involving Stored Procedures

Disclosed techniques can be used in scenarios other than basic read and write operations. In particular, disclosed techniques can allow stored procedures to be routed to non-anchor nodes for execution. A stored procedure is set of instructions, typically a plurality of instructions, such as statements in a query language (for example, DML statements or DQL statements, but which can also include data definition language (DDL) statements or data control language (DCL) statements). When the stored procedure is called, the instructions are executed as a unit. So, at least some database stored procedures can be thought of as scripts. Some database stored procedures are more complex, such as including programming language operations in addition to database query language operations. Some types of databases stored procedures can include instructions that are nested, including instructions in the context of one or more conditional logic statements (such as IF . . . ELSE statements, or SWITCH statements).

Figure 7:
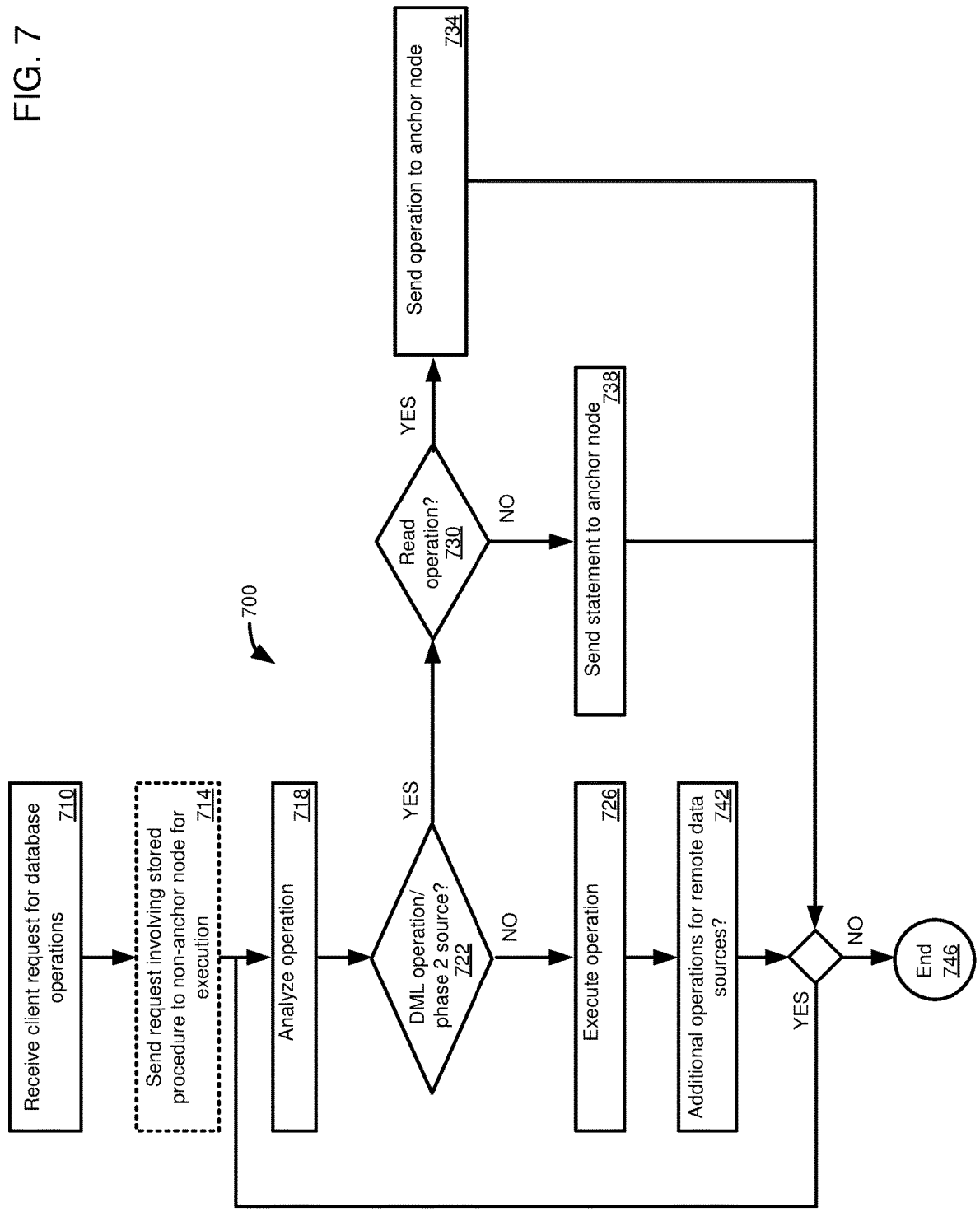
FIG. 7 is a flowchart of a process of executing a stored procedure that accesses data stored in a federated computing system.

As will be further described in conjunction with a method 700 illustrated in the flowchart of FIG. 7, disclosed techniques can provide that stored procedures can be sent to a non-anchor node for execution. If operations are encountered that should be performed by an anchor node, such as because a virtual table referenced in the stored procedure is in a second phase, where operations are to be performed at the anchor node, the relevant operation or statement can be sent from the non-anchor node to the anchor node for execution. In the method 700, when a select statement includes operators for a virtual table that is in the second phase, the relevant operators are sent to the anchor node for execution, rather than sending an entire statement that includes the operators (or having operations which gave rise to the operators). For write operations, the entire statement that includes the write operation (or operator) is sent from the non-anchor node to the anchor node for execution. However, in other implementations, both operators for select operations and operators for write operations can be sent from the non-anchor node to the anchor node for execution, rather than sending an entire statement. In either case, after a statement or operator is executed, results can be sent from the anchor node to the non-anchor node for further processing. Although the details of transitioning virtual tables between phases and tracking the status of virtual tables are not discussed in this Example 8, these operations can be carried out as described in previous Examples.

In the method 700, a request for database operations is received from a client at 710, where the request specifies one or more operations with respect to a virtual table. The request includes a request for database operations involving a stored procedure, and the stored procedure is executed by the non-anchor node. If the request is received by an anchor node, it can be routed to a non-anchor node at 714, and the remaining operations in the method 700 are performed by the non-anchor node. If the request was received by a non-anchor node, or after the non-anchor node receives the request from the anchor node at 714, the non-anchor node can begin processing the stored procedure at 718.

A first operation, which can be a statement or an operation that is part of a statement, in the stored procedure is analyzed at 718. At 722 it is determined whether the operation is a write operation (DML), is a read operation (SELECT) that accesses a virtual table that is in a second phase where operations using the virtual table are to be executed by the anchor node, or is a read operation that accesses a virtual table that is in a first phase where operations for the virtual table can be executed by the anchor node or by a non-anchor node.

If it is determined at 722 that the operation is a read operation for a virtual table in the first phase, the read operation is executed, or scheduled or defined for execution (such as having an operation specified in a query plan), by the non-anchor node at 726. If it is determined that the operation is for a virtual table and the operation is other than a read operation for a virtual table in the first phase, the method 700 proceeds to 730. At 730, it is determined whether the operation is a write request for a virtual table or is a read request for a virtual table that is in the second phase. If the operation is a read request for a virtual table that is in the second phase, the operation, but not an entire statement that contains the operation, is sent to the anchor node for execution at 734. As an example, consider a SELECT statement that selects a column A from a first virtual table and a column B from a second virtual table. Assume that the first virtual table is in the first phase and the second virtual table is in the second phase. In this case, rather than shipping the entire SELECT statement to the anchor node, only the operator that performs the select from the second virtual table is sent to the anchor node.

If it is determined at 730 that the operation is a write operation, the entire statement containing the write operation is sent to the anchor node for execution at 738. Although not shown in FIG. 7, additional actions can be taken in response to detecting/executing a write operation for a virtual table, such as marking the virtual table as being in the second phase and invalidating and recompiling query plans that include the virtual table. These actions can be carried out as described with respect to FIG. 4. As an example of how an entire statement might be sent for execution, consider an UPDATE statement that modifies a value of records satisfying particular criteria, where the criteria are determined as a result of a JOIN operation. In the case of statement shipping, the entire UPDATE statement is shipped, even though the statement includes both a read operation to identify relevant data and then a write operation to modify values of such data. Assume that the result of the UPDATE is a change to values of records only in a single virtual table of multiple virtual tables involved in the JOIN. In the case of operator shipping, operations directly involving the virtual table being modified are shipped to the anchor node, but other operations that do not directly involve that table could also be shipped to the anchor node, or could be performed by the non-anchor node.

After 734 or 738, the method 700 proceeds to 742 where it is determined whether the stored procedure includes additional operations involving virtual tables. If so, the method 700 returns to 718. Otherwise, the method 700 can end at 746.

Example 9—Example Operations in Table Distribution Determination

Figure 8:
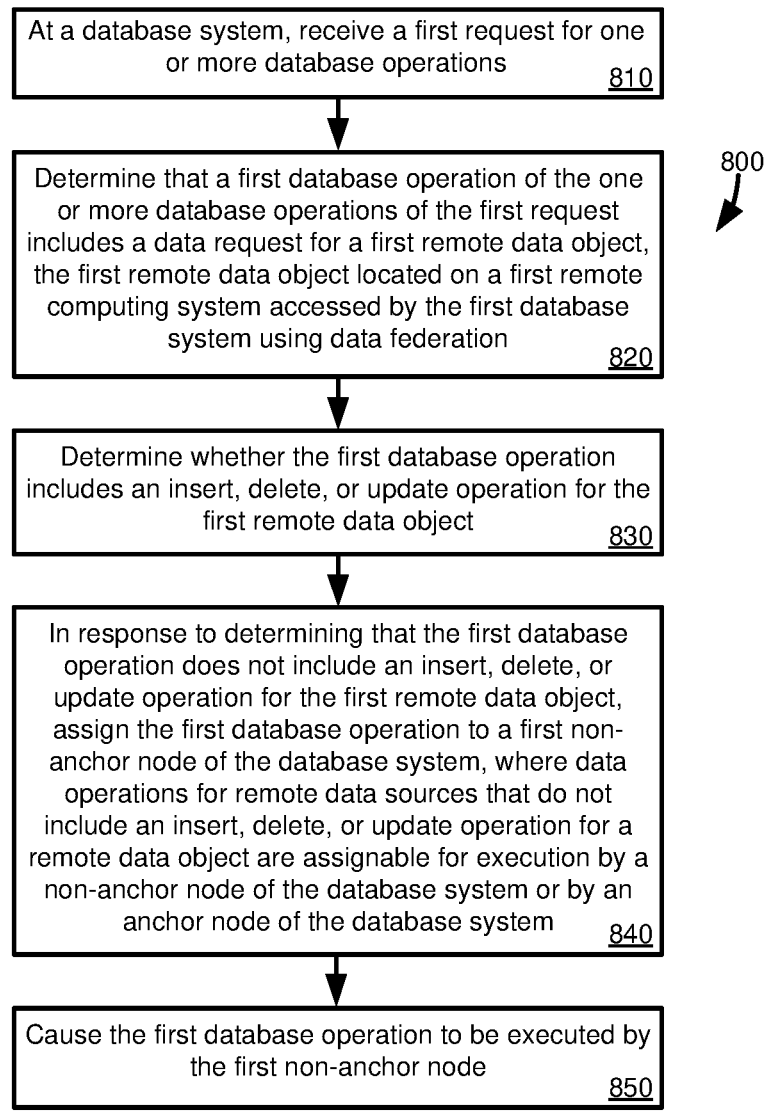
FIG. 8 is flowchart of a process of executing a request for a database operation involving a remote data object in a system that includes an anchor node and one or more non-anchor nodes.

FIG. 8 is a flowchart of a process 800 of executing a request for a database operation that includes a data request for a remote data object at a system that includes an anchor node and one or more non-anchor nodes. The process can be implemented in the computing environments 100, 200, or 300 of FIG. 1, 2, or 3.

At a database system, a first request for one or more database operations is received at 810. It is determined at 820 that a first database operation of the one or more database operations of the first request includes a data request for a first remote data object, the first remote data object located on a first remote computing system accessed by the first database system using data federation. At 830, it is determined whether the first database operation includes an insert, delete, or update operation for the first remote data object. In response to determining that the first database operation does not include an insert, delete, or update operation for the first remote data object, at 840, the first database operation is assigned to a first non-anchor node of the database system, where data operations for remote data sources that do not include an insert, delete, or update operation for a remote data object are assignable for execution by a non-anchor node of the database system or by an anchor node of the database system. The first database operation is caused to be executed by the first non-anchor node at 850.

Example 10—Computing Systems

Figure 9:
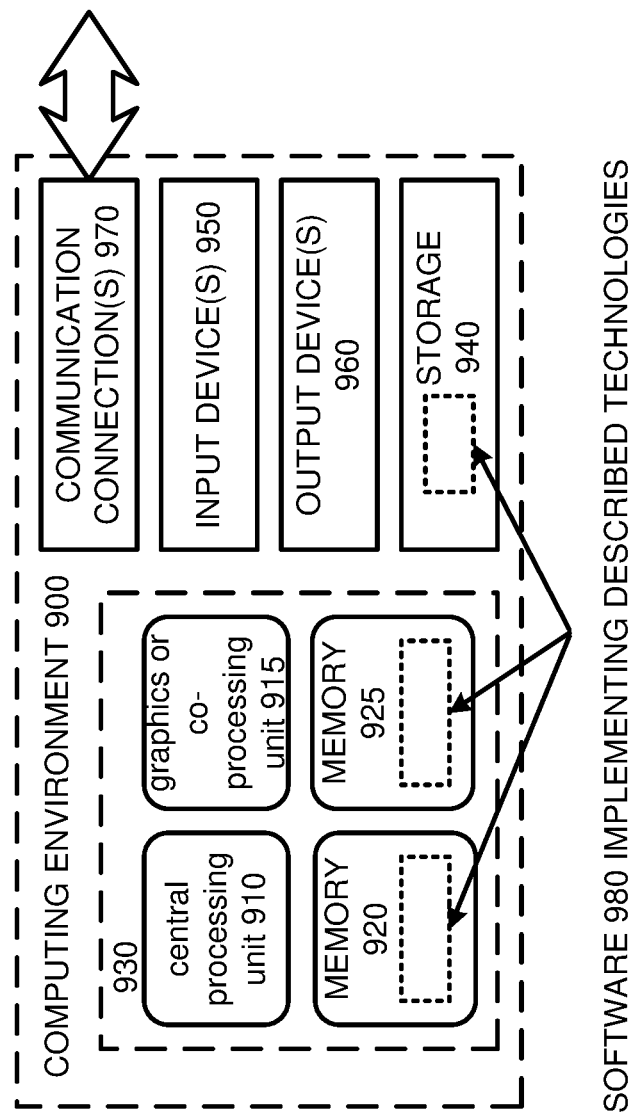
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 10:
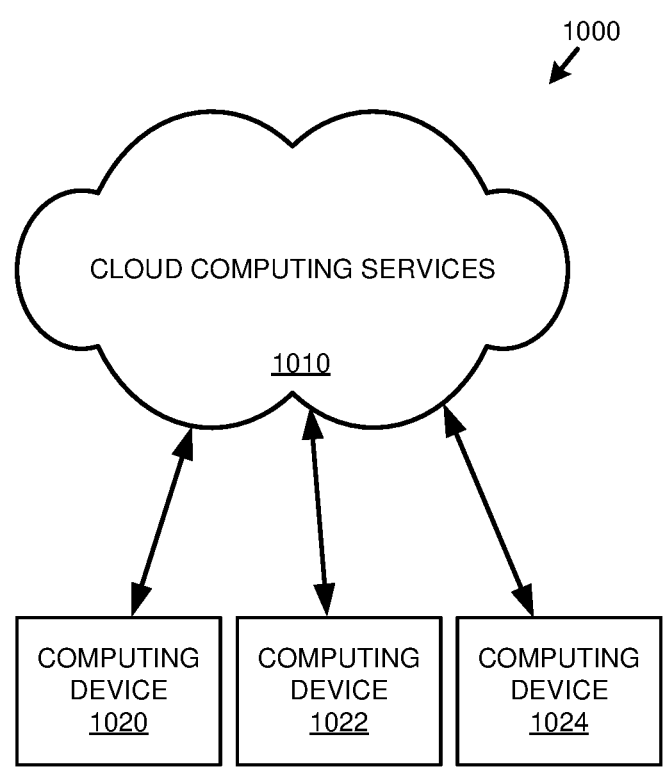
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions that, when executed, cause the computing system to perform operations comprising:
   at a database system, receiving a first request for one or more database operations;
   determining that a first database operation of the one or more database operations of the first request comprises a first data request for a first remote data object, the first remote data object located on a first remote computing system accessed by the database system using data federation;
   determining whether the first database operation includes an insert, delete, or update operation for the first remote data object;
   in response to determining that the first database operation does not include an insert, delete, or update operation for the first remote data object, assigning the first database operation to a first non-anchor node of the database system, wherein data operations for remote data sources that do not include an insert, delete, or update operation for a remote data object are assignable for execution by a non-anchor node of the database system or by an anchor node of the database system;
   causing the first database operation to be executed by the first non-anchor node;
   determining that a second database operation, the second database operation being a database operation of the one or more database operations of the first request or a database operation of a second request for one or more database operations, comprises a second data access request for the first remote data object;
   determining whether the second database operation includes an insert, delete, or update operation for the first remote data object;
   in response to determining that the second database operation includes an insert, delete, or update operation for the first remote data object, causing the second database operation to be performed by the anchor node;
   at the database system, after causing the second database operation to be performed at the anchor node, receiving a third request for one or more database operations, wherein a database operation of the one or more database operations of the third request comprises a read request; and
   causing the third database operation to be performed by the anchor node.

2. The computing system of claim 1, wherein the first request for one or more database operations is not restricted to read requests for the first remote data object.

3. The computing system of claim 1, the operations further comprising:
   in response to the determining that the second database operation comprises an insert, delete, or update operation for the first remote data object, associating the first remote data object with an indicator that the second database operation and any subsequent database operations of the first request, the second request, or a database operation of a subsequent request for one or more database operations, are to be performed at the anchor node of the database system.

4. The computing system of claim 3, the operations further comprising:
   receiving an instruction to commit a transaction that comprises the first request, the second request, and any subsequent requests; and
   in response to the receiving an instruction, dissociating the indicator from the first remote data object.

5. The computing system of claim 3, the operations further comprising:
   receiving an instruction to roll back a transaction that comprises the first request, the second request, and any subsequent requests; and in response to the receiving an instruction, dissociating the indicator from the first remote data object.

6. The computing system of claim 3, the operations further comprising:
receiving a third request for one or more database operations, wherein the third request is the first request, the second request, or a request other than the first request or the second request;
determining that a first database operation of the third request comprises a data request for a second remote data object located on a second remote computing system accessed by the database system using data federation, wherein the second remote data object is different than the first remote data object and the second remote computing system is the first remote computing system or is a remote computing system different than the first remote computing system;
determining whether the first database operation of the third request comprises an insert, delete, or update operation for the second remote data object;
while the indicator is associated with the first remote data object, in response to determining that the first database operation of the third request does not include an insert, delete, or update operation for the second remote data object, assigning the first database operation of the second request to a second non-anchor node of the database system, wherein the second non-anchor node is the first non-anchor node or is a non-anchor node other than the first non-anchor node; and
causing the first database operation of the third request to be executed by the second non-anchor node.

7. The computing system of claim 3, the operations further comprising:
in response to the associating, analyzing one or more query plans that access the first remote data source;
determining that a query plan of the one or more query plans references the first remote data object using the first non-anchor node; and
preparing a revised query plan that specifies that a read operation of the query plan is set to be executed using the anchor node instead of the first non-anchor node.

8. The computing system of claim 3, the operations further comprising:
determining that the first remote data object comprises a stored procedure;
after the associating, determining that a first data operation of the stored procedure comprises a read request for the first remote data object, the read request comprising a first data operation for the first remote data object and a second data operation for a database object that is local to the database system;
sending the first data operation from the first non-anchor node to the anchor node for execution; and
executing the second data operation at the first non-anchor node.

9. The computing system of claim 3, the operations further comprising:
determining that the first remote data object comprises a stored procedure;
after the associating, determining that a first data operation of the stored procedure comprises an insert, delete, or update request for the first remote data object, the insert, delete, or update request comprising a first data operation for the first remote data object and a second data operation for a database object that is local to the database system;

sending the insert, delete, or update request for the first remote data object to the anchor node for execution.

10. The computing system of claim 3, the operations further comprising:
determining that the first remote data object comprises a stored procedure;
after the associating, determining that a first data operation of the stored procedure comprises an insert, delete, or update request for the first remote data object, the insert, delete, or update request comprising a first data operation for the first remote data object and a second data operation for a database object that is local to the database system;
sending the first data operation from the first non-anchor node to the anchor node for execution; and
executing the second data operation at the first non-anchor node.

11. The computing system of claim 1, wherein the database system comprises a first database object that has a schema that is mapped to a schema of the first remote data object.

12. The computing system of claim 11, wherein the first database object is a virtual table.

13. The computing system of claim 1, the operations further comprising:
sending data from a local table to be used in a remote join at the first remote computing system from the first non-anchor node to the first remote computing system.

14. A method, implemented in a computing system comprising at least one hardware processor and at least one memory coupled to the at least one hardware processor, the method comprising:
at a database system, receiving a first request for one or more database operations;
determining that a first database operation of the one or more database operations of the first request comprises a first data request for a first remote data object, the first remote data object located on a first remote computing system accessed by the database system using data federation;
determining whether the first database operation includes an insert, delete, or update operation for the first remote data object;
in response to determining that the first database operation does not include an insert, delete, or update operation for the first remote data object, assigning the first database operation to a first non-anchor node of the database system, wherein data operations for remote data sources that do not include an insert, delete, or update operation for a remote data object are assignable for execution by a non-anchor node of the database system or by an anchor node of the database system;
causing the first database operation to be executed by the first non-anchor node;
determining that a second database operation, the second database operation being a database operation of the one or more database operations of the first request or a database operation of a second request for one or more database operations, comprises a second data access request for the first remote data object;
determining whether the second database operation includes an insert, delete, or update operation for the first remote data object;
in response to determining that the second database operation includes an insert, delete, or update operation for the first remote data object, causing the second database operation to be performed by the anchor node;

at the database system, receiving a third request for one or more database operations, wherein a database operation of the one or more database operations of the third request comprises a read request; and causing the third database operation to be performed by the anchor node.

15. The method of claim 14, wherein the first request for one or more database operation is not restricted to read requests for the first remote data object.

16. The method of claim 14, further comprising:

in response to the determining that the second database operation comprises an insert, delete, or update operation for the first remote data object, associating the first remote data object with an indicator that the second database operation and any subsequent database operations of the first request, a second request, or a database operation of a subsequent request for one or more database operations, are to be performed at the anchor node at the database system.

17. The method of claim 16, further comprising:

receiving an instruction to commit or roll back a transaction that comprises the first request, the second request, and any subsequent requests; and in response to the receiving the instruction, dissociating the indicator from the first remote data object.

18. One or more computer-readable storage media comprising:

computer-executable instructions that, when executed by a computing system comprising at least one hardware processor and at least one memory coupled to the at least one hardware processor, cause the computing system to, at a database system, receive a first request for one or more database operations;

computer-executable instructions that, when executed by the computing system, cause the computing system to determine that a first database operation of the one or more database operations of the first request comprises a first data request for a first remote data object, the first remote data object located on a first remote computing system accessed by the database system using data federation;

computer-executable instructions that, when executed by the computing system, cause the computing system to determine whether the first database operation includes an insert, delete, or update operation for the first remote data object;

computer-executable instructions that, when executed by the computing system, cause the computing system to, in response to determining that the first database operation does not include an insert, delete, or update operation for the first remote data object, assign the first database operation to a first non-anchor node of the database system, wherein data operations for remote data sources that do not include an insert, delete, or update operation for a remote data object are assignable for execution by a non-anchor node of the database system or by an anchor node of the database system;

computer-executable instructions that, when executed by the computing system, cause the computing system to cause the first database operation to be executed by the first non-anchor node;

computer-executable instructions that, when executed by the computing system, cause the computing system to determine that a second database operation, the second database operation being a database operation of the one or more database operations of the first request or a database operation of a second request for one or more database operations, comprises a second data access request for the first remote data object;

computer-executable instructions that, when executed by the computing system, cause the computing system to determine whether the second database operation includes an insert, delete, or update operation for the first remote data object;

computer-executable instructions that, when executed by the computing system, cause the computing system to, in response to determining that the second database operation includes an insert, delete, or update operation for the first remote data object, cause the second database operation to be performed by the anchor node;

computer-executable instructions that, when executed by the computing system, cause the computing system to, at the database system, receive a third request for one or more database operations, wherein a database operation of the one or more database operations of the third request comprises a read request; and computer-executable instructions that, when executed by the computing system, cause the computing system to cause the third database operation to be performed by the anchor node.

19. The one or more computer-readable storage media of claim 18, wherein the first request for one or more database operations is not restricted to read requests for the first remote data object.

20. The one or more computer-readable storage media of claim 18, further comprising:

computer-executable instructions that, when executed by the computing system, cause the computing system to, in response to the determining that the second database operation comprises an insert, delete, or update operation for the first remote data object, associate the first remote data object with an indicator that the second database operation and any subsequent database operations of the first request, the second request, or a database operation of a subsequent request for one or more database operations, are to be performed at the anchor node of the database system.

* * * * *